United States Patent [19]

Tinholt

[11] 4,064,980
[45] Dec. 27, 1977

[54] DUAL SPEED VISCOUS FLUID COUPLING

[75] Inventor: Thomas H. Tinholt, Marshall, Mich.

[73] Assignee: Eaton Corporation, Cleveland, Ohio

[21] Appl. No.: 731,263

[22] Filed: Oct. 12, 1976

[51] Int. Cl.² ............ F16D 35/00; F16D 43/25
[52] U.S. Cl. .................. 192/58 B; 123/41.12; 123/41.46; 192/48.8; 192/82 T; 192/103 F
[58] Field of Search ......... 192/48.8, 58 B, 82 T, 192/103 F; 123/41.11, 41.12, 41.46

[56] References Cited

U.S. PATENT DOCUMENTS

| | | | |
|---|---|---|---|
| 3,430,743 | 3/1969 | Fujita et al. | 192/58 B |
| 3,444,748 | 5/1969 | Sutaruk | 192/58 B X |
| 3,536,175 | 10/1970 | Kawabe et al. | 192/58 B |
| 3,840,101 | 10/1974 | Peter et al. | 192/58 B |
| 3,924,716 | 12/1975 | Brewer | 192/58 B |

*Primary Examiner*—Allan D. Herrmann
*Attorney, Agent, or Firm*—Teagno & Toddy

[57] ABSTRACT

A viscous fluid coupling is provided of the type driven by a prime mover, the speed of which varies over a wide range. The coupling includes an output member defining two fluid chambers, with an input member being rotatably disposed in each of the fluid chambers, and the two input members being driven by the prime mover at different rotational speeds. At lower prime mover speeds, viscous fluid is pumped into the fluid chamber containing the higher speed ratio input member to provide a higher ratio of output speed to prime mover speed. At higher prime mover speeds, viscous fluid is pumped into the fluid chamber containing the lower speed ratio input member to provide a lower ratio of output speed to prime mover speed. Utilizing the disclosed fluid coupling as a drive for a radiator cooling fan results in more cooling at low engine speeds, but less wasted power at higher engine speeds.

11 Claims, 5 Drawing Figures

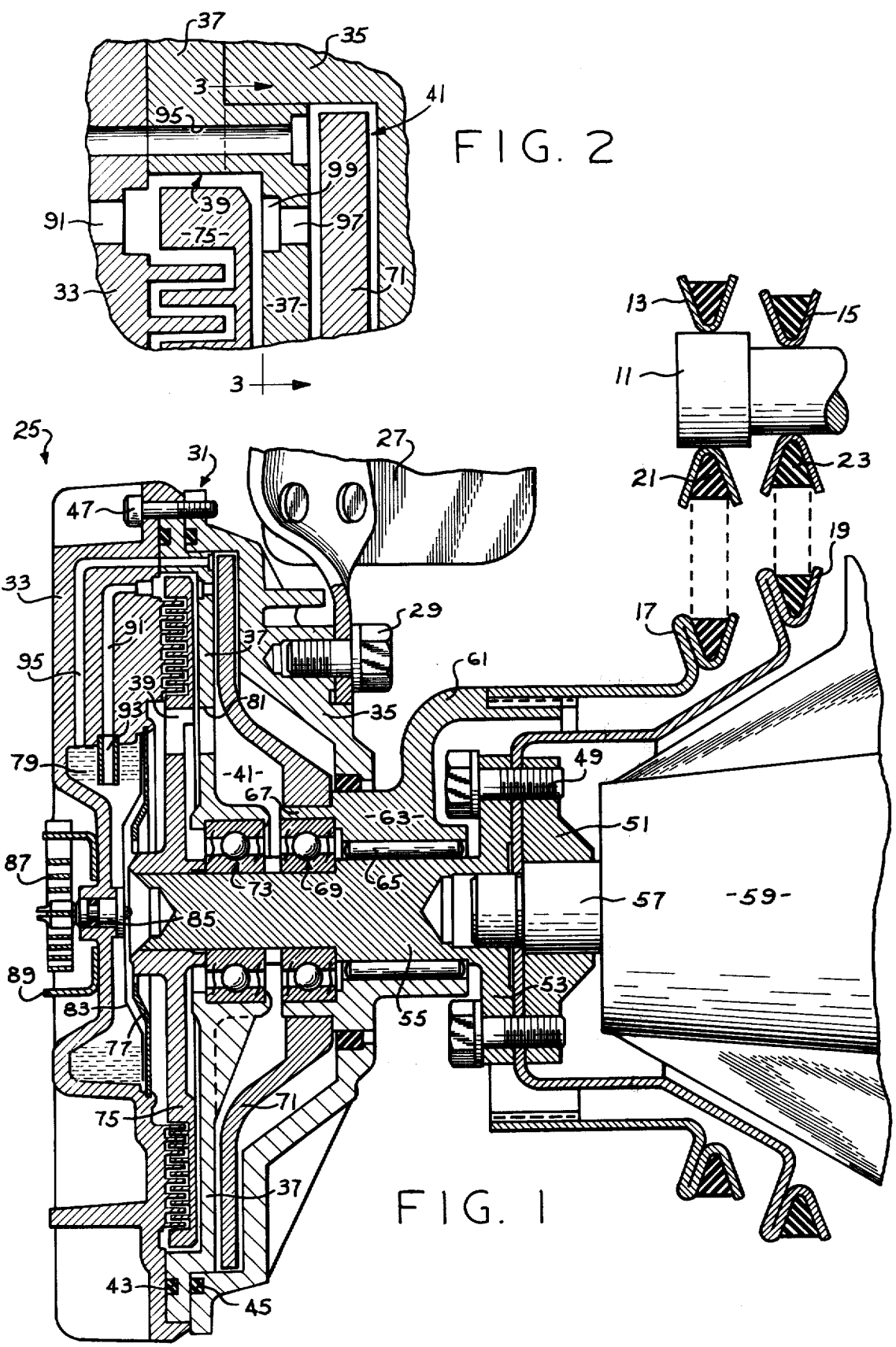

DUAL SPEED VISCOUS FLUID COUPLING

BACKGROUND OF THE INVENTION

The present invention relates to viscous fluid couplings, and more particularly, to such couplings which are capable of more than one ratio of output speed to prime mover speed.

It will be apparent from a reading of the specification that the present invention may be advantageously utilized with fluid couplings intended for many different applications. However, the invention is especially useful when applied to a viscous fluid coupling which serves as a drive for the radiator cooling fan of a vehicle engine, and will be described in connection therewith.

Those working in the viscous fan drive art have long recognized the desirability of a fan drive having a high speed ratio (i.e., ratio of output or fan speed to input or engine speed) at low engine speeds when the least air is being forced through the radiator merely by movement of the vehicle.

It has also been recognized that as engine speed increases, it is desirable to decrease the speed ratio so that less horsepower is being wasted driving the fan when the higher vehicle speed is forcing a greater amount of air through the radiator. Reducing this speed ratio of the fan drive at higher engine speeds is also desirable to reduce the heat buildup within the fan drive.

Recognition of the need for a fan drive having more than one speed ratio is evidenced by U.S. Pat. No. 3,444,748, assigned to the assignee of the present invention, which illustrates a fan drive including a fluid coupling providing a higher ratio at lower engine speeds, and an overrunning clutch providing lower ratios at high engine speeds. However, the fan drive shown in the cited patent includes no provision for disengagement when the air temperature within the engine compartment is such that operation of the fan is unnecessary. Furthermore, the fan drive of the cited patent could not be modified in an obvious manner to provide for temperature-responsive disengagement at higher engine speeds, at which there is a direct mechanical connection or drive from the input to the fan through the overrunning clutch.

SUMMARY OF THE INVENTION

Accordingly, it is an object of the present invention to provide an improved viscous fan drive having a relatively higher speed ratio at low engine speeds, and a relatively lower speed ratio at higher engine speeds, with a smooth transition from one ratio to the other.

It is another object of the present invention to povide such a viscous fan drive in which torque is transmitted from the input to the output by viscous shear stress over the entire range of operating speeds of the drive.

It is a related object of the present invention to provide a viscous fan drive which accomplishes the above-stated objects and in addition, is able to disengage when operation of the fan is not necessary, thereby saving a substantial amount of engine horsepower and energy.

The above and other ojbects of the present invention are accomplished by the provision of a viscous fluid coupling having an output coupling member which defines a low speed (i.e., low engine speed) fluid chamber and a high speed (i.e., high engine speed) fluid chamber. A first input coupling member is rotatably disposed within the low speed chamber and a second input coupling member is rotatably disposed within the high speed chamber. The coupling includes means for transmitting a given engine speed into a rotational speed X of the first input coupling member and into a rotational speed Y of the second input coupling member, the speed X being greater than the speed Y for any given engine speed. A first means provides a quantity of viscous fluid in the low speed fluid chamber below a certain engine speed to transmit torque from the first input coupling member to drive the output coupling member at a rotational speed A which is less than X but greater than Y. A second means provides a quantity of viscous fluid in the high speed fluid chamber above the certain engine speed to transmit torque from the second input coupling member to drive the output coupling member at a rotational speed B which is less than the rotational speed Y.

BRIEF DESCRIPTION OF THE DRAWINGS

FIG. 1 is a longitudinal cross section of a viscous fluid coupling made in accordance with the teachings of the present invention.

FIG. 2 is an enlarged, fragmentary cross section of a portion of FIG. 1.

DESCRIPTION OF THE PREFERRED EMBODIMENT

Figure 3:
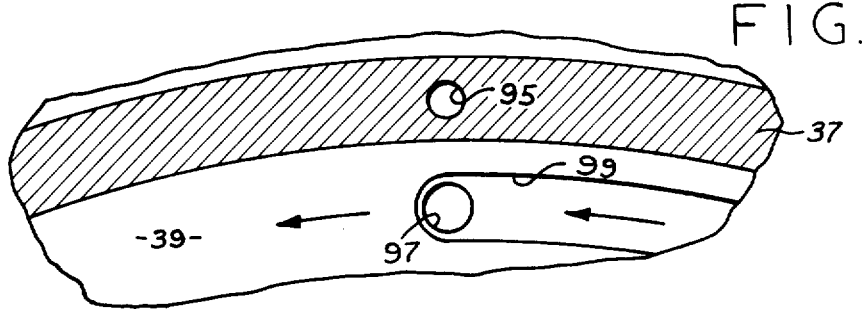
FIG. 3 is a transverse cross section taken on line 3—3 of FIG. 2, and on the same scale, illustrating one condition of operation of the invention.

Referring now to the drawings, which are not intended to limit the invention, FIG. 1 illustrates a viscous fluid coupling made in accordance with the teachings of the present invention, and comprising a portion of an overall fan drive system. A prime mover (not shown), which is typically the vehicle engine, drives a crankshaft 11 on which are mounted a pair of pulleys 13 and 15. The pulleys 13 and 15 transmit torque from the prime mover to a pair of pulleys 17 and 19, respectively, by means of a pair of V-belts 21 and 23, respectively. As is well known in the art, pulley 13 is somewhat larger than pulley 15 and pulley 17 is somewhat smaller than pulley 19, the combined result being that pulley 17 has a substantially greater rotational speed than does pulley 19.

The pulleys 17 and 19 provide the rotational inputs to a viscous fluid coupling, generally designated 25 to which a radiator cooling fan 27 is attached, as by means of a plurality of bolts 29.

The viscous fluid coupling 25 includes an output coupling assembly, generally designated 31 which comprises a front cover member 33, a rear cover member 35, and a partition member 37, disposed between the front and rear cover members 33 and 35. The front cover member 33 and partition member 37 cooperate to define a high speed fluid chamber 39, while the partition member 37 and rear cover member 35 cooperate to define a low speed fluid chamber 41. The members 33, 35 and 37 are sealed adjacent their peripheries by a pair of O-rings 43 and 45, and are held together in tight sealing engagement by means of a plurality of bolts 47.

Referring again to the input portion of the drive system shown in FIG. 1, the pulley 19 is attached by a plurality of bolts 49 to an annular mounting plate 51 and to a flange portion 53 of an input shaft 55. Both the support plate 51 and the input shaft 55 are rotatably supported on a stub shaft 57, of the type which may typically protrude from another vehicle engine accessory, such as a water pump 59.

The pulley 17 is in driving engagement with a torque transmitting member 61 which includes a hub portion 63 journaled on the input shaft 55 by means of a set of roller bearings 65. The torque transmitting member 61 also includes an annular portion 67 disposed about the outer race of a suitable bearing set 69, the inner race of which is seated on a reduced diameter portion of the input shaft 55. In driving engagement with the annular portion 67 is a disc-like input coupling member 71 disposed within the low speed fluid chamber 41. Also seated on the reduced diameter portion of input shaft 55 is the inner race of a suitable bearing set 73, the outer race of which is disposed within a central opening of the partition member 37.

In driving engagement with the forward end (left end in FIG. 1) of input shaft 55 is an input coupling member 75, which is rotatably disposed within the high speed fluid chamber 39. Thus, it may be seen that the input coupling member 71 rotates at the same speed as the pulley 17, while the input coupling member 75 rotates at the same speed as the pulley 19, and that each of the speed ratios of input coupling members 71 and 75 to the crankshaft 11 is constant. In the subject embodiment, the diameters of pulleys 13, 15, 17 and 19 have been selected such that the input coupling member 71 is driven at a ratio of 1.5:1, while the input coupling member 75 is driven at a ratio of 1.0:1, as may be seen graphically by reference to FIG. 5. It should be appreciated, however, that the present invention is not limited to any particular input speed ratios or any particular relationship between the ratios, but rather, an essential feature of the invention is the provision of two separate input coupling members, one having a rotational speed X for any given engine speed, and the other having a rotational speed Y for any given engine speed, the rotational speed X being substantially greater than the rotational speed Y.

A valve plate 77 is held in fixed engagement with the front cover member 33 and cooperates therewith to define a fluid reservoir chamber 79. The valve plate 77 separates the fluid reservoir chamber 79 from the high speed fluid chamber 39 and defines a fill orifice (not shown) as is well known in the art, and which permits fluid to flow from the reservoir chamber 79 to the high speed fluid chamber 39 as well as to the low speed fluid chamber 41, through an opening 81 in the partition member 37.

In conventional prior art viscous fluid couplings, it is possible to disengage the coupling by restricting or preventing the flow of fluid from the reservoir to the working chamber, and this typically occurs automatically in response to a predetermined condition, such as the ambient air external to the coupling being below a predetermined temperature. Similarly, it is an important feature of the coupling of the present invention that it may be disengaged at any point over its entire operating speed range in response to the occurrence of a predetermined condition. Therefore, although the disengagement of the viscous fluid coupling 25 may, within the scope of the invention, occur either manually or automatically, and in response to any of a number of conditions, it is preferred that the disengagement be temperature sensitive, and the subject embodiment will be described in connection therewith. A valve arm 83 is rotatably disposed adjacent the valve plate 77 to control the flow fo fluid through the previously-mentioned fill orifice in a manner well known in the art. The valve arm 83 is attached to one end of a valve shaft 85, which is rotatably supported within a hub defined by the front cover member 33. The outer end of the valve shaft 85 defines a slot which receives one end of a bimetal coil 87, the other end of the coil 87 being held fixed relative to the front cover member 33 by means of a bracket member 89, which may be welded to cover member 33.

The front cover member 33 defines a discharge passage 91 communicating return or discharged fluid from the high speed fluid chamber 39 to the reservoir chamber 79. Adjacent the opening of the discharge passage 91 into the reservoir chamber 79 there is disposed a hollow, tubular member 93 extending radially inward toward the axis of rotation of the fluid coupling. When the coupling is rotating, and fluid in the reservoir chamber 79 is held in the position shown in FIG. 1 by centrifugal force, it is the purpose of the tubular member 93 to extend radially inward beyond the fluid level, to prevent or at least minimize fluid in the reservoir 79 flowing radially outward through the discharge passage 91. A discharge passage 95 communicates return or discharged fluid from the low speed fluid chamber 41 to the reservoir chamber 79.

Referring now th the enlarged, fragmentary views shown in FIGS. 2 and 3, in conjunction with FIG. 1, it may be seen that the partition member 37 defines a fluid passage 97 communicating between the high speed fluid chamber 39 and the low speed fluid chamber 41. As may best be seen in FIG. 3, the fluid passage 97 opens into a pump groove 99, the function of the passage 97 and groove 99 being described in greater detail subsequently.

OPERATION

Throughout the subsequent description of the operation of the viscous fluid coupling 25, it will be assumed that the bimetal coil 87 is subjected to a temperature above the minimum which indicates a need for cooling, such that the valve arm 83 is in a position which does not appreciably restrict the flow of fluid from the fluid reservoir chamber 79 into the high speed and low speed fluid chambers 39 and 41.

As is well known in the viscous fluid coupling art, torque may be transmitted from an input member to an output member by means of the viscous shear stress or viscous shear drag exerted on the output member in response to rotation of the input member. The ability to transmit torque through a viscous fluid medium is related to a number of factors including shear area. In the subject embodiment, the input coupling member 75 and front cover member 33 define a plurality of annular, interdigitated lands and grooves, an arrangement which is well known in the art and is conventionally utilized for maximum shear area. On the other hand, the input coupling member 71 merely has its opposing flat surfaces closely spaced in relationship to the adjacent surfaces of the rear cover member 35 and the partition member 37. It should be understood that the scope of the present invention is not limited to any particular configuration of either of the input coupling members, or the output coupling member, or the shear area defined therebetween, and any reasonable configuration of the coupling members and shear areas capable of transmitting torque by means of a viscous fluid may be utilized and is within the scope of the invention.

As engine speed begins to rise (see FIG. 5), fluid flows from the reservoir chamber 79 into the high speed fluid chamber 39 and, partly because of the resistance to the flow of fluid presented by the lands and grooves, a major portion of the fluid entering the high speed fluid chamber 39 flows radially outward between the input coupling member 75 and the partition member 37. The input coupling member 71, moving at rotational speed X, exerts a viscous drag to drive the output coupling assembly 31 at a rotational speed A which is less than the rotational speed X of input coupling member 71, but greater than the rotational speed Y of input coupling member 75. This is illustrated in the "low speed" (i.e., low engine speed) region of the graph of FIG. 5, which includes plots of the speed of input coupling member 71 (and pulley 17) and of input coupling member 75 (and pulley 19). Also included is a curve showing the speed of output coupling assembly 31 (and fan 27).

Figure 4:
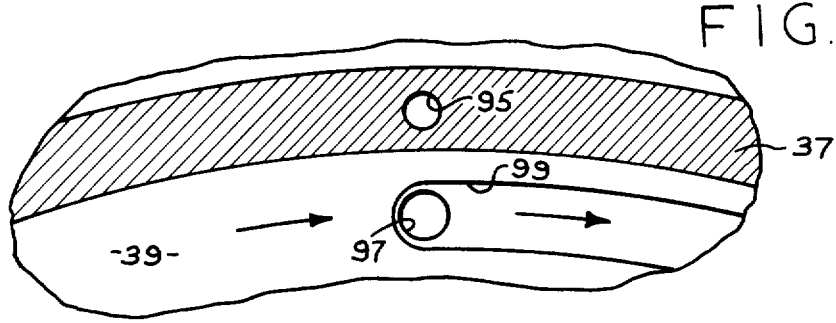
FIG. 4 is a transverse cross section, similar to FIG. 3, illustrating a different condition of operation of the invention.

For purposes of the subsequent explanation it will be assumed that all components are rotating clockwise, as viewed from the left in FIG. 1, and as viewed in FIGS. 3 and 4. On the graph showing the output speed of coupling assembly 31 and the fan 27, a representative point has been selected and labeled "F.3", corresponding to the view shown in FIG. 3. At reference point F.3 the engine speed is 1000 rpm. Therefore, the speed of input coupling member 75 is 1000 rpm and the speed of input coupling member 71 is 1500 rpm, while the speed of the output assembly 31 is about 1340 rpm. Under these conditions, the fluid in the high speed fluid chamber 39 is rotating at a speed somewhere between 1000 rpm and 1340 rpm, with the speed of the fluid adjacent the partition member 37 and within the pump groove 99 being less than 1340 rpm, such that the direction of the fluid relative to the partition member 37 is in the direction indicated by the arrows in FIG. 3. As is understood in the art, such a relative movement of fluid within the pump groove 99 causes a region of increased fluid pressure, resulting in a flow through the fluid passage 97 into the low speed fluid chamber 41. Thus, in the low speed, high ratio range, fluid is pumped from the high speed fluid chamber 39 into the low speed fluid chamber 41 because the rotational speed A of the output coupling assembly 31 is greater than the rotational speed Y of the input coupling member 75.

Figure 5:
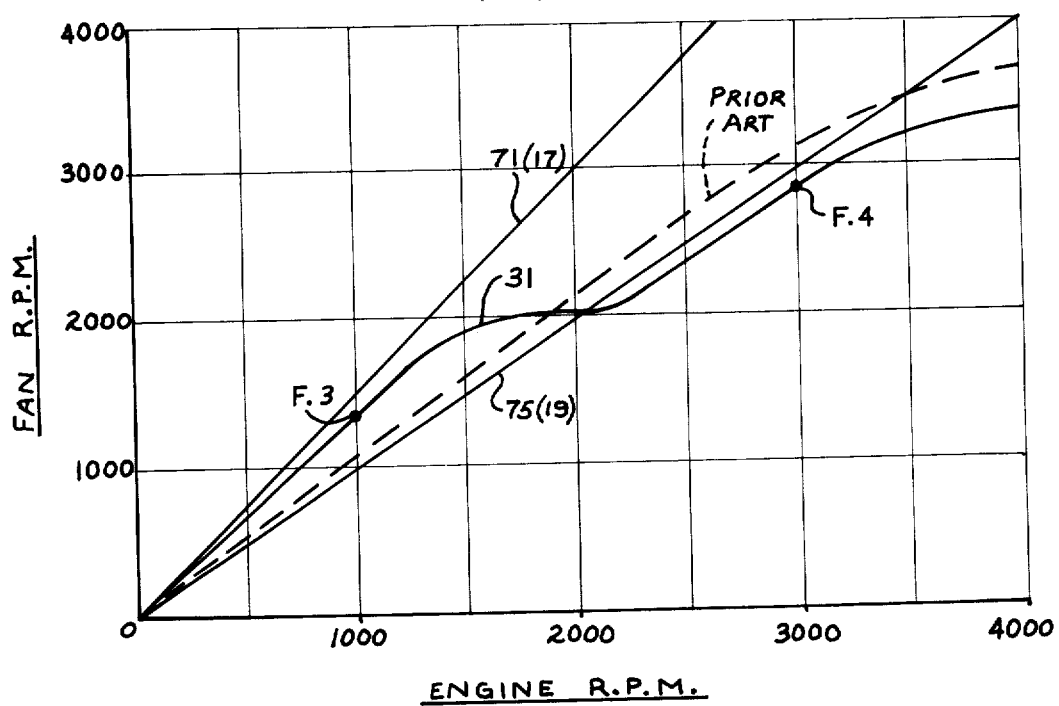
FIG. 5 is a graph of fan speed vs. engine speed.

As may be seen in the graph of FIG. 5, as the engine speed approaches 1500 rpm, the rotational speed of the output assembly 31 begins to level off. As is generally understood in the art, the specific point at which this occurs for any particular fluid coupling is controlled by such factors as the fluid viscosity, the shear area and the spacing between the shear surfaces. After the output speed has leveled off, a point occurs at just about 2000 rpm engine speed at which the speed of the output assembly 31 is equal to that of the input coupling member 75. As this point is approached, the speed of the fluid in high speed chamber 39 relative to the pump groove 89 decreases until the speed of output 31 equals that of input coupling member 75, and the pumping of fluid through fluid passage 97 ceases. When this occurs, the centrifugal force pressure head in the low speed fluid chamber 41 causes a reversal in the direction of flow through fluid passage 97, such that some of the fluid which might be in the low speed fluid chamber 41 is now pumped into the high speed fluid chamber 39. Furthermore, as the slip speed (i.e., difference) of the input coupling member 71 relative to the output assembly 31 increases, there is an increasing tendency for fluid in the low speed fluid chamber 41 to be pumped back to the reservoir chamber 79 through the discharge passage 95.

As engine speed continues to increase, the rotational speed of the output assembly 31 drops below that of the input coupling member 75 and both continue to rise while maintaining a relatively constant slip speed therebetween.

The graph representing the speed of output assembly 31 includes a reference point labeled "F.4", corresponding to the condition shown in FIG. 4. At this reference point, both the engine and the input coupling member 75 are rotating at 3000 rpm, while the output assembly 31 is rotating at approximately 2840 rpm. Because the input coupling member 75 is now rotating faster than the output assembly 31, the fluid in the high speed fluid chamber 39 is now moving in the direction shown by the arrows in FIG. 4, relative to the partition member 37 and the pump groove 99. Therefore, throughout the high speed, low ratio range, because of the relative direction of movement of the fluid, no increase in fluid pressure occurs adjacent fluid passage 97, and no pumping of fluid occurs from the high speed fluid chamber 39 to the low speed fluid chamber 41, but rather, the movement of the fluid past the groove 99 and passage 97 may even create a region of relatively lower pressure to suck fluid from the low speed fluid chamber 41.

Accordingly, it may be seen by comparing the speed of output assembly 31 to that of a conventional or "Prior Art" viscous fluid coupling (dashed line), that the present invention provides a viscous fluid coupling which, in the low speed, high ratio range provides higher fan speed and therefore greater cooling, while in the high speed, low ratio range provides a lower fan speed to save horsepower and energy. In addition, the present invention provides a viscous fluid coupling adapted to be disengaged when operation of the fan is not necessary.

Among the alternative embodiments which would occur to one skilled in the art from the foregoing description is an arrangement somewhat similar in overall appearance to that illustrated in the previously mentioned U.S. Pat. No. 3,444,748. In this alternative embodiment, the input portion (i.e., the pulleys, shafts, etc.) would be substantially as shown in FIG. 1 of the present invention, but each of the input coupling members 75 and 71 would be associated with a separate fluid clutch output member. Each of the output members would have an output pulley driving a pulley on another shaft, each of those pulleys having associated therewith a one way clutch to permit the shaft to be driven by whichever one of the fluid clutches contains fluid and is operating at a higher speed at any given moment. Communication of fluid from the one fluid clutch to the other could be accomplished in any of several ways, utilizing the relative speeds of the various rotating members as taught herein. For example, fluid could be permitted to pass from the one clutch to the other through one or more passages in the input shaft.

The present invention has been described in great detail sufficient to enable one skilled in the art to practice the invention. It is believed that many alterations and modifications will occur to those skilled in the art upon a reading of the foregoing specification and it is my intention to include all such alterations and modifications insofar as they come within the scope of the appended claims.

I claim:

1. A viscous fluid coupling adapted to be driven by a prime mover, the fluid coupling comprising:
   a. an output coupling member rotatable about an axis and defining a low speed fluid chamber and a high speed fluid chamber;
   b. a first input coupling member rotatably disposed within said low speed fluid chamber;
   c. a second input coupling member rotatably disposed within said high speed fluid chamber;
   d. means for transmitting a given motion of the prime mover into a rotational speed X of said first input coupling member and into a rotational speed Y of said second input coupling member, said rotational speed X being greater than said rotational speed Y for any given motion of the prime mover;
   e. first means for providing a quantity of viscous fluid in said low speed fluid chamber below a certain speed of the prime mover to transmit torque from said first input coupling member to drive said output coupling member at a rotational speed A which is less than X but greater than Y; and
   f. second means for providing a quantity of viscous fluid in said high speed fluid chamber above said certain speed of the prime mover to transmit torque from said second input coupling member to drive said output coupling member at a rotational speed B which is less than said rotational speed Y.

2. A viscous fluid coupling as claimed in claim 1 wherein said output coupling member defines a fluid reservoir chamber and first and second discharge passage means communicating between said low speed and high speed fluid chambers, respectively, and said fluid reservoir chamber.

3. A viscous fluid coupling as claimed in claim 2 wherein said first and second means for providing viscous fluid include said fluid reservoir chamber and valve means movable between a first position permitting fluid flow from said fluid reservoir chamber to the appropriate one of said low speed and high speed fluid chambers and a second position blocking said fluid flow.

4. A viscous fluid coupling as claimed in claim 3 including temperature-responsive control means operatively associated with said valve means to move said valve means between said first and second positions in response to changes in a selected temperature condition.

5. A viscous fluid coupling as claimed in claim 4 wherein said temperature-responsive control means includes a bimetal element disposed to respond to changes in the temperature of the ambient air external to said coupling.

6. A viscous fluid coupling as claimed in claim 1 wherein said first means for providing viscous fluid includes means for pumping a portion of the fluid in said high speed fluid chamber into said low speed fluid chamber.

7. A viscous fluid coupling as claimed in claim 6 wherein said pumping means is operative only in response to said output coupling member being driven at said rotational speed A, greater than said rotational speed Y of said second input coupling member.

8. A viscous fluid coupling as claimed in claim 6 wherein said output coupling member includes a partition member disposed between said low speed and high speed fluid chambers, said partition member defining a passage providing fluid communication between said high speed and low speed fluid chambers.

9. A viscous fluid coupling as claimed in claim 8 wherein said pumping means includes said partition passage and means causing a region of increased fluid pressure within said high speed fluid chamber adjacent said partition passage in response to rotation of said output coupling member at a speed greater than that of said second input coupling member.

10. A viscous fluid coupling as claimed in claim 1 wherein torque is transmitted from said first and second input coupling members to drive said output coupling member by means of viscous shear stress.

11. A viscous fluid coupling assembly adapted to be driven by a prime mover, the assembly comprising:
    a. a low speed fluid clutch rotatable about an axis, defining a fluid chamber and including a low speed input coupling member;
    b. a high speed fluid clutch rotatable about an axis, defining a fluid chamber and including a high speed input coupling member;
    c. means for transmitting a given motion of the prime mover into first rotational speed X of said low speed input coupling member and into a rotational speed Y of said high speed input coupling member, said rotational speed X being greater than said rotational speed Y for any given motion of the prime mover;
    d. first means for providing a quantity of viscous fluid in said fluid chamber of said low speed clutch below a certain speed of the prime mover to transmit torque from said low speed input coupling member to drive said low speed clutch at a rotational speed A which is less than X but greater than Y; and
    e. second means for providing a quantity of viscous fluid in said fluid chamber of said high speed clutch above said certain speed of the prime mover to transmit torque from said high speed input coupling member to drive said high speed clutch at a rotational speed B which is less than said rotational speed Y.

* * * * *